United States Patent
Staley et al.

(10) Patent No.: US 6,717,769 B2
(45) Date of Patent: Apr. 6, 2004

(54) EJECT BUTTON FOR DISK DRIVE WITH LIGHT PIPE

(75) Inventors: Shaun Staley, Nibley, UT (US); Spencer W. Stout, Layton, UT (US)

(73) Assignee: Iomega Corporation, San Diego, CA (US)

(*) Notice: Subject to any disclaimer, the term of this patent is extended or adjusted under 35 U.S.C. 154(b) by 346 days.

(21) Appl. No.: 09/854,289

(22) Filed: May 11, 2001

(65) Prior Publication Data

US 2002/0167755 A1 Nov. 14, 2002

(51) Int. Cl.⁷ .............................................. G11B 17/04

(52) U.S. Cl. .................................. 360/99.06; 369/77.2

(58) Field of Search ........................... 360/99.06, 96.5, 360/99.02, 96.6; 369/77.1, 77.2, 75.1, 75.2

(56) References Cited

U.S. PATENT DOCUMENTS

| 5,600,513 A | * | 2/1997 | Nakata et al. ........... 360/99.08 |
| 5,650,891 A | | 7/1997 | Thayne et al. ........... 360/99.06 |
| 6,567,360 B1 | * | 5/2003 | Kagawa ..................... 369/75.1 |

FOREIGN PATENT DOCUMENTS

JP       08-138476       *   5/1996

* cited by examiner

Primary Examiner—Craig A. Renner
(74) Attorney, Agent, or Firm—James T. Hagler

(57) ABSTRACT

A removable disk cartridge drive has an eject member that moves from a forward position to a rearward position upon insertion of the cartridge from the drive. A coupling member extends between an eject button on the drive and a switch which energizes an electro-mechanical device to eject the cartridge when the switch is triggered. The coupling member is a clear plastic which transmits light to the eject button to indicate the presence of a cartridge in the drive.

9 Claims, 8 Drawing Sheets

EJECT BUTTON FOR DISK DRIVE WITH LIGHT PIPE

BACKGROUND

1. Field of the Invention

This invention relates to a data storage drive of the type that accepts a removable disk cartridge and more particularly to an eject button for such a drive with a light pipe.

2. Description of the Prior Art

Removable disk cartridges for storing digital electronic information typically comprise an outer casing or shell that houses a rotatable recording medium, or disk, upon which electronic information can be stored. The cartridge shell often comprises upper and lower halves that are joined together to house the disk. The disk is mounted on a hub that rotates freely within the cartridge. When the cartridge is inserted into a data storage drive, e.g., disk drive, a spindle motor in the drive engages with the disk hub in order to rotate the disk within the cartridge. The outer shell of the cartridge typically has some form of opening near its forward edge to provide the recording heads of the drive with access to the recording surfaces of the disk. A shutter or door mechanism is provided to cover the opening when the cartridge is not in use to prevent dust or other contaminants from entering the cartridge and settling on the recording surface of the disk.

Data storage drives perform a number of functions incident to the recording and/or retrieval of information from a disk cartridge. Two very critical functions are: to latch or hold the cartridge in place during operation, releasing and ejecting the cartridge only at an appropriate time and only under certain conditions, and locking the read/write heads of the disk drive in place to prevent movement of the heads under inappropriate circumstances.

U.S. Pat. No. 5,560,891, Thayne et al. shows a disk drive commonly referred to as the ZIP® Drive supplied by Iomega Corporation. Such a disk drive has an eject button on the front panel of the drive which, when manually depressed, initiates the ejection of the cartridge from the drive. When a cartridge is in the drive, light is supplied by the eject button to indicate to the user that a cartridge is present in the drive. When the eject button is depressed by the user, a switch in the drive is actuated and an electro-mechanical device is energized to eject the cartridge from the drive.

It is an object of the present invention to provide an improved eject button and coupling member for such a drive.

SUMMARY OF THE INVENTION

In accordance with the present invention a coupling member between the eject button and the energizing switch in a disk drive is made of plastic material which transmits light from a light emitting diode to the eject button to indicate the presence of a cartridge in the drive. The coupling member transmits light from a light emitting diode (LED) mounted on a printed circuit assembly inside the disk drive to the front bezel where it is viewable to the user. The triggering switch is also mounted on the printed circuit board to eject the cartridge when the eject button is depressed by the user.

In accordance with the invention the coupling member translates horizontal motion at the eject button/light pipe interface into vertical motion at the switch. The switch is triggered by compression or vertical loading of the switch which greatly reduces the chance of breaking the switch and light emitting diode from the printed circuit board as compared to horizontal loading of components on the printed circuit board.

Further in accordance with the invention the coupling member of this invention is constructed of a clear plastic material such as polycarbonate so that the light is transmitted through the part. This eliminates the need for a separate light pipe to conduct light to the eject button.

Further in accordance with the invention a hook provides a pivot point that constrains the coupling member so that a portion of the coupling member rotate as forces are applied.

Further in accordance with the invention a localized thin section in the coupling member acts as a hinge and a portion of the coupling member deflects to trigger the switch. The coupling member has an increased width at the thin section to increase the cross-sectional area and to enable sufficient light transfer through the coupling member and to increase the rebounding force from the triggering position.

Further in accordance with the invention, a guide feature constrains the motion of the translating portion of the coupling member.

A capture feature allows the coupling member to be pre-loaded and positioned in the free or unused position. This minimizes undesirable play and clearances in the assembly.

The foregoing and other objects, features and advantages of the invention will be better understood from the following more detailed description and appended claims.

SHORT DESCRIPTION OF THE DRAWINGS

DETAILED DESCRIPTION OF THE PREFERRED EMBODIMENTS

Figure 1:
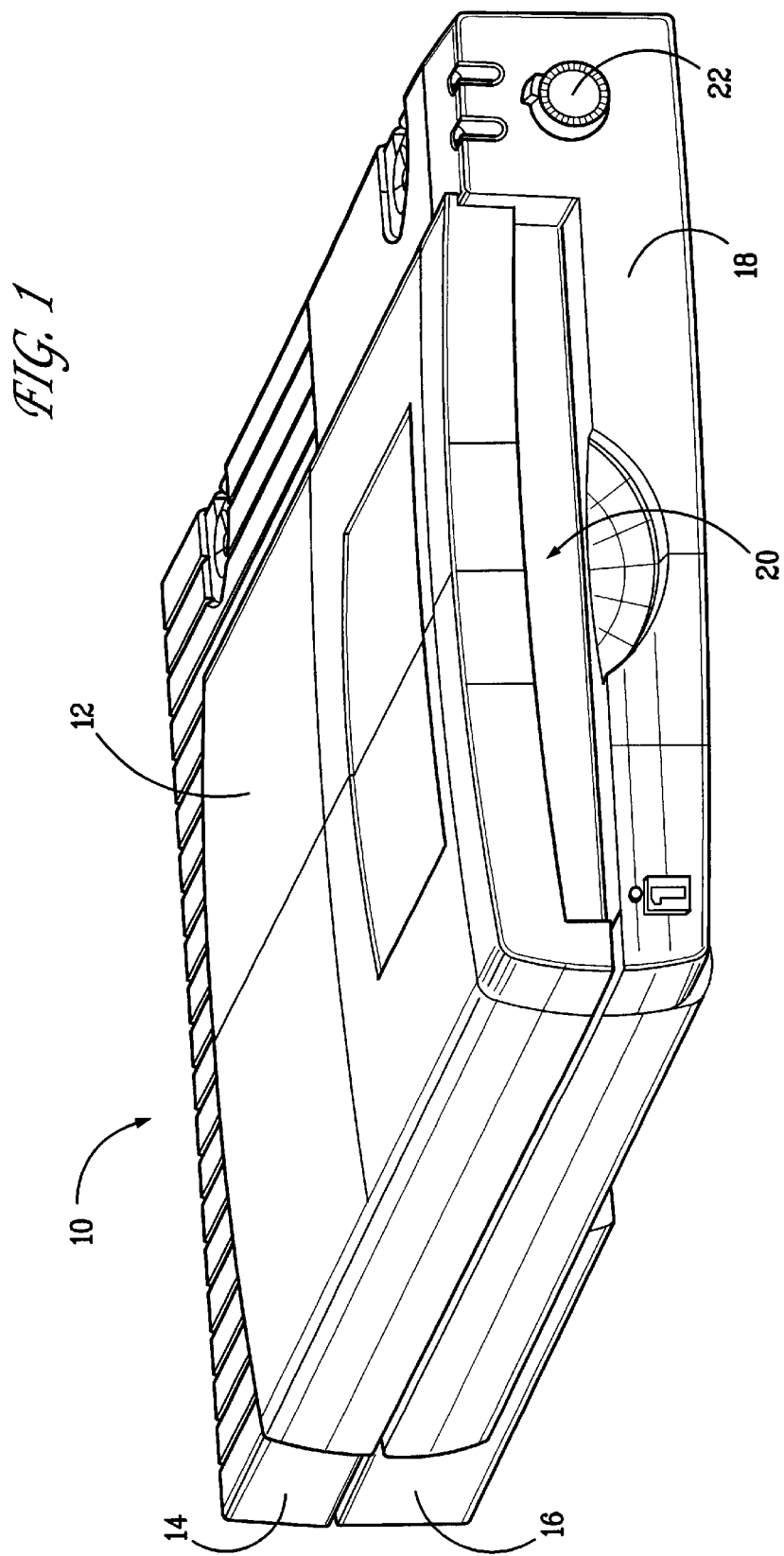
FIG. 1 is a perspective view of the disk drive upon which the present invention is an improvement.

Referring to the drawings wherein like numerals indicate like elements throughout, there is shown in FIG. 1 a data storage drive 10, in which the present invention is embodied. As shown, the disk drive 10 comprises an outer housing 12 having top and bottom covers 14, 16 and a front panel, or bezel 18. A disk cartridge can be inserted into the disk drive 10 through a horizontal opening 20 in the front panel 18 of the disk drive 10. An eject button 22 is also provided on the front panel for automatically ejecting a disk cartridge from the disk drive.

Figure 2:
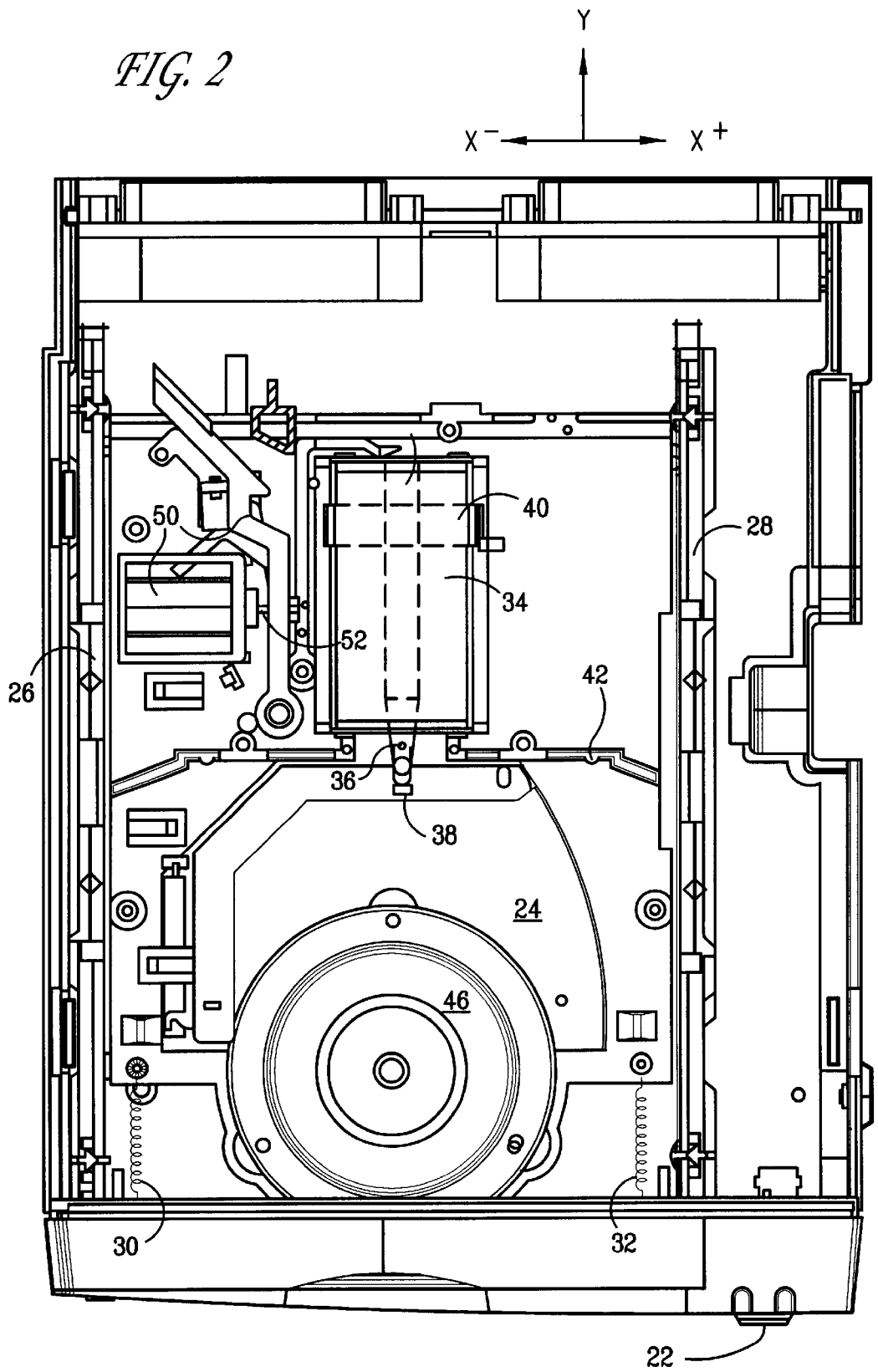
FIG. 2 is a top view of the disk drive of FIG. 1 with a top cover of the housing removed.

FIG. 2 is a top view of the disk drive of FIG. 1 with the top cover 14 removed. The disk drive comprises an internal platform 24 that slides along opposing side rails 26, 28 between a forward position (FIG. 2) and a rearward position. A pair of springs 30, 32 bias the platform toward its forward position.

An actuator 34, which in the preferred embodiment comprises a linear actuator, is mounted to the rear of the platform 24. The linear actuator comprises a carriage assembly having two lightweight flexible arms 36. The recording heads 38 of the disk drive are mounted at the ends of the respective arms. A coil 40, which is part of a voice coil motor, is mounted at the opposite end of the carriage. The coil interacts with magnets (not shown) to move the carriage linearly so that the heads 38 can move radially over respective recording surfaces of a disk cartridge inserted into the disk drive.

A raised wall 42 is formed on the platform. The raised wall 42 extends across the width of the platform 24, perpendicularly to the direction of motion of the carriage. The raised wall 42 defines an eject member that engages the front peripheral edge of the disk cartridge upon insertion of the disk cartridge into the disk drive. The opposite side edges of the eject member are angled in the same manner as the opposite front corners of the disk cartridge.

The disk drive further comprises a spindle motor 46 capable of rotating the recording medium of a disk cartridge at a predetermined operating speed. In the present embodiment, the spindle motor 46 is coupled to the platform 24. When a disk cartridge is inserted into the disk drive, the hub of the disk cartridge engages the spindle motor 46 of the disk drive when the platform 24 reaches its rearward position.

An electromechanical device, i.e. a solenoid 50, is mounted on the platform 24 and has a drive shaft 52. When the solenoid 50 is energized by an electrical current, the drive shaft 52 moves in the X-direction from a normally extended position toward a retracted position which releases the platform 24 to move forward with the stored energy of springs 30, 32 to eject the cartridge.

Figure 3:
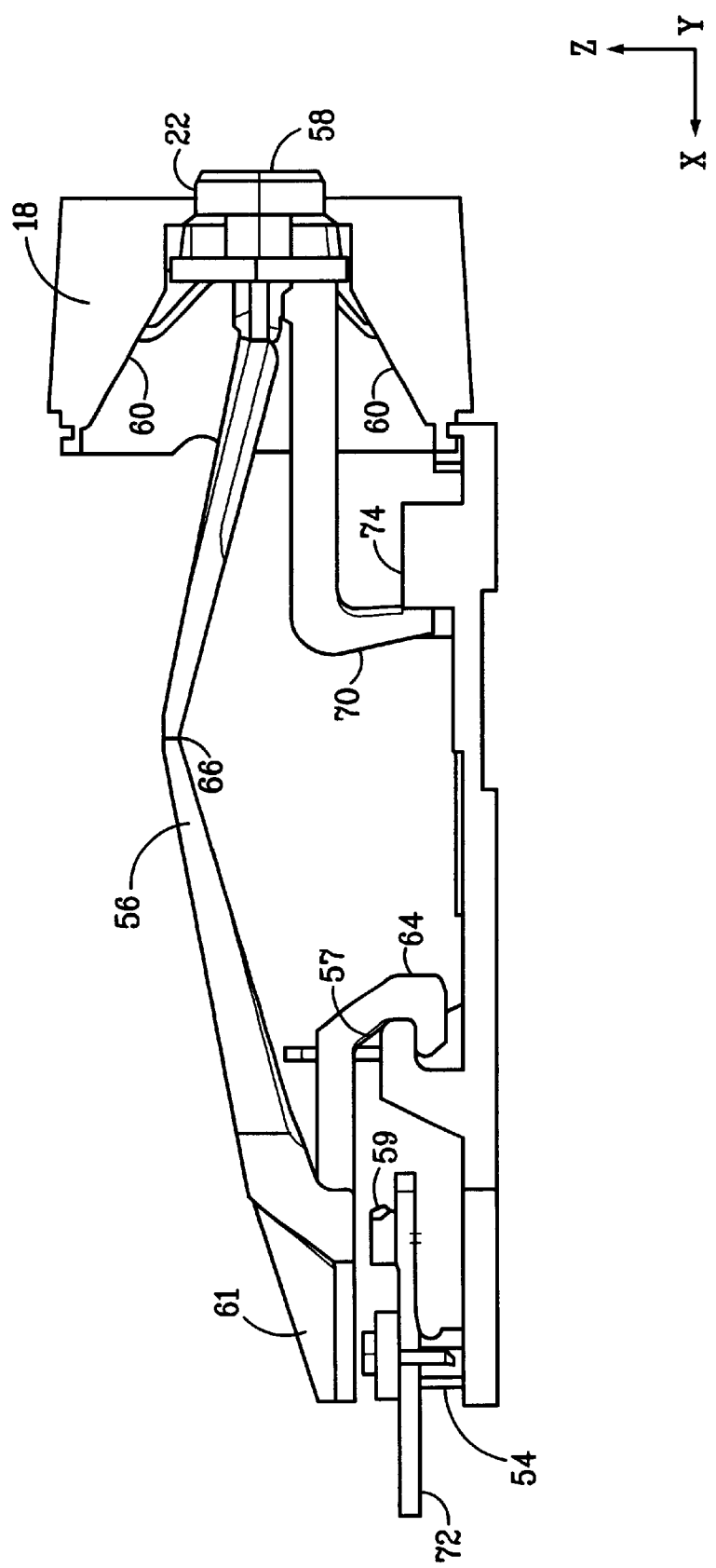
FIG. 3 is side elevational view of the coupling member of the present invention with the eject button in the unactuated position.

When it is desired to eject a disk cartridge from the disk drive, the eject button 22 on the front panel 18 of the disk drive 10 is pushed. A processor (not shown) in the disk drive detects the activation of the eject button and applies an electrical signal to the solenoid 50. FIG. 3 shows the switch 54 which energizes the solenoid 50 to eject the cartridge.

Once released, the platform 24 moves back to its forward position under the force of springs 30, 32. As the platform 24 moves back to the forward position, the disk cartridge is backed out of the opening 20 and can then be removed by a user.

All the foregoing is shown and described more fully in U.S. Pat. No. 5,650,891 which is incorporated herein by reference.

In accordance with the present invention a coupling member 56 (FIGS. 3–9) is connected between the eject button 22 and the switch 54 to trigger the switch when the eject button is actuated. Eject button 22 has a button light pipe screen 58 which transmits light to the user indicating the presence of a cartridge in the drive. Coupling member 56 is a translucent plastic which transmits the light to the eject button 22 to indicate the presence of a cartridge in the drive. Light from Light Emitting Diode (LED) 59 travels through the coupling member 56 to illuminate the light pipe screen 58 when a cartridge is in the drive. A reflective surface 61 on the coupling member directs light from the LED 59 into the coupling member 56. A printed circuit assembly (PCA) 72 mounts the switch 54 and the LED 59.

Figure 4A:
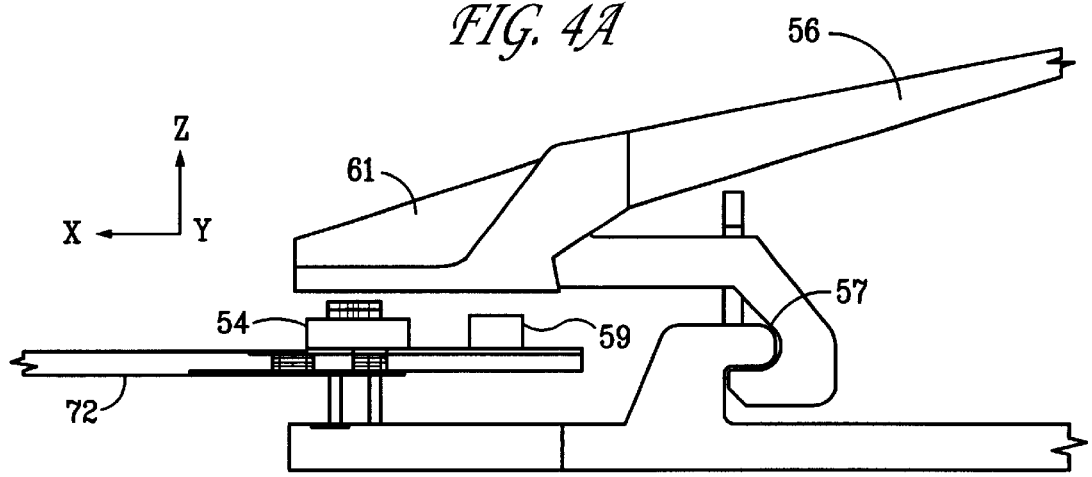
FIGS. 4A and 4B are side elevational views of the coupling member with the eject button in the normal position and in the depressed position, respectively.
Figure 4B:
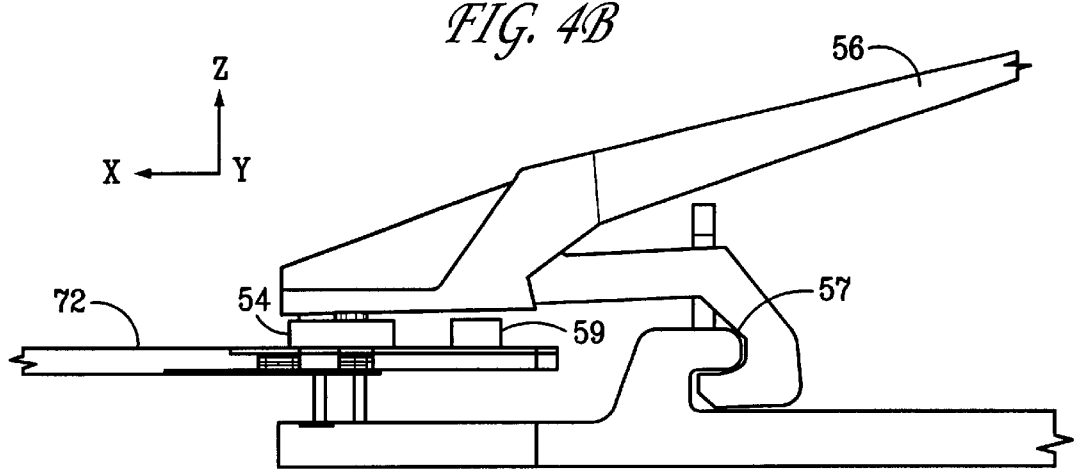
Figure 5A:
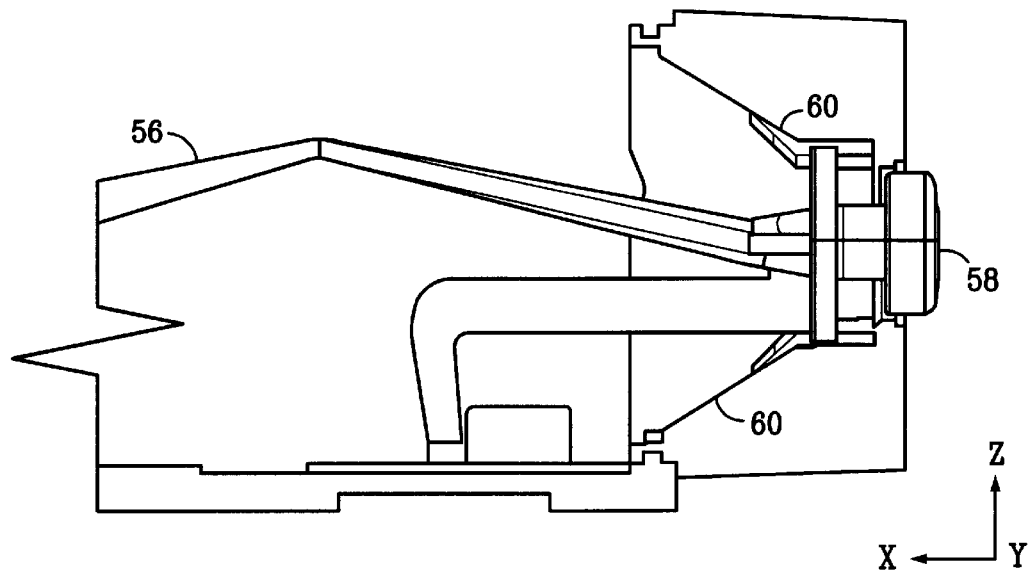
FIGS. 5A and 5B are side elevational views of the eject button in the normal position and in the depressed position, respectively.
Figure 5B:
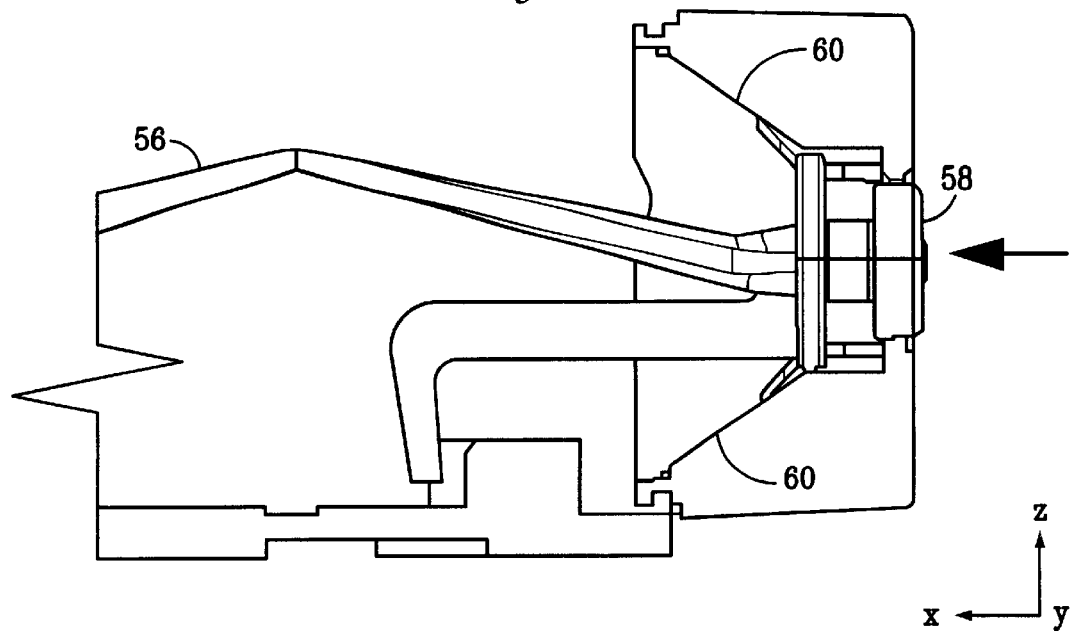
Figure 6:
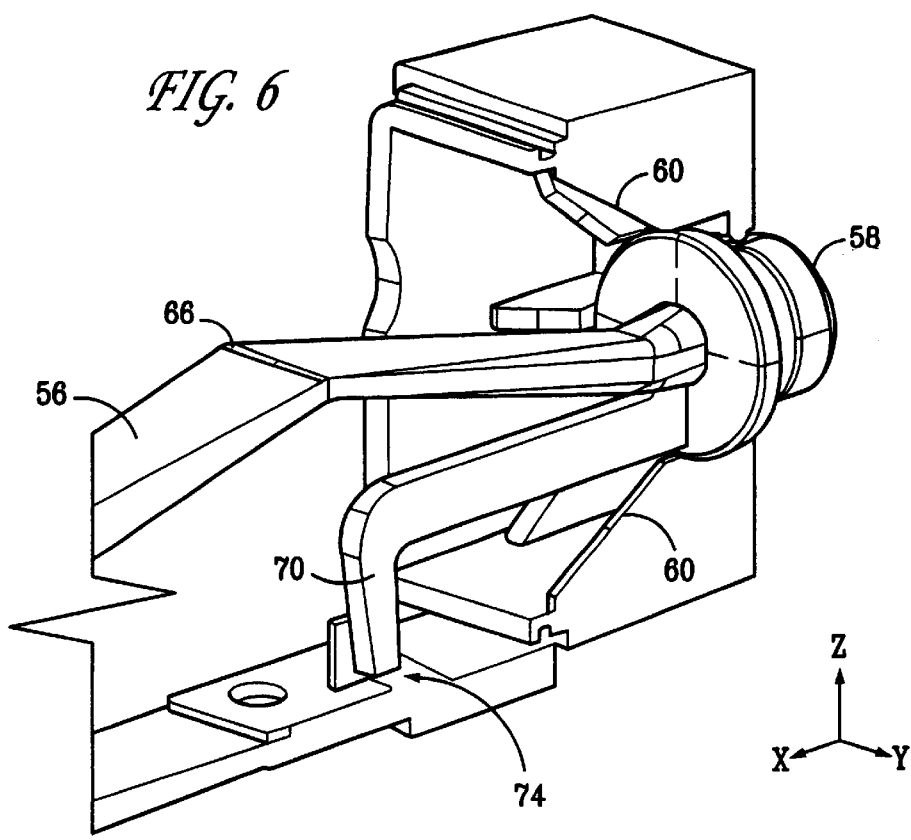
FIG. 6 is an isometric view of the guide features and capture hook.
Figure 7:
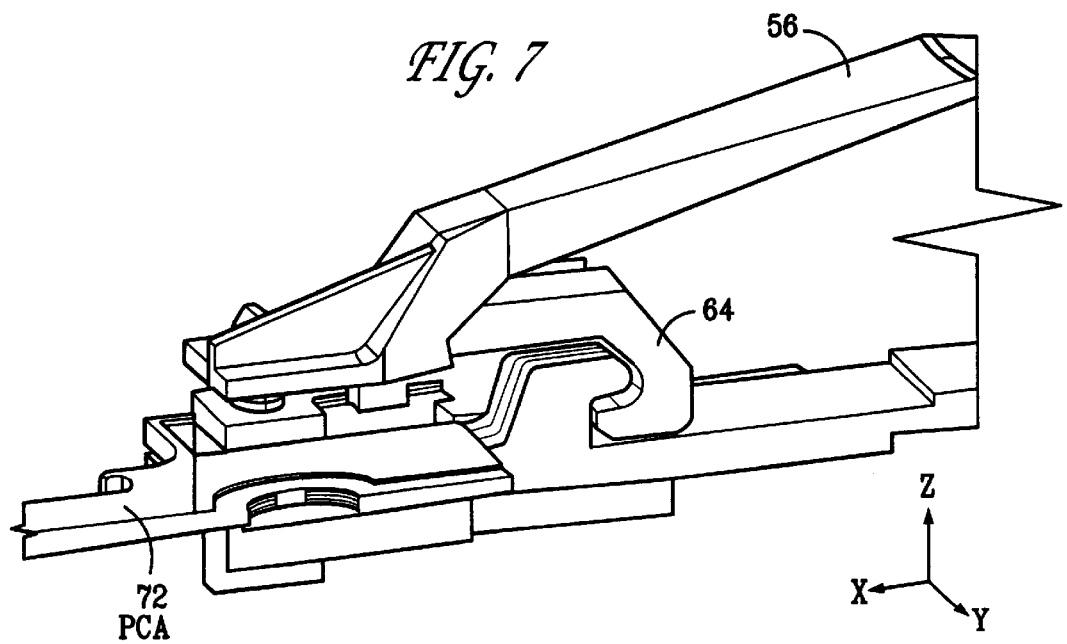
FIG. 7 is an isometric view of the printed circuit assembly and components thereon.
Figure 8:
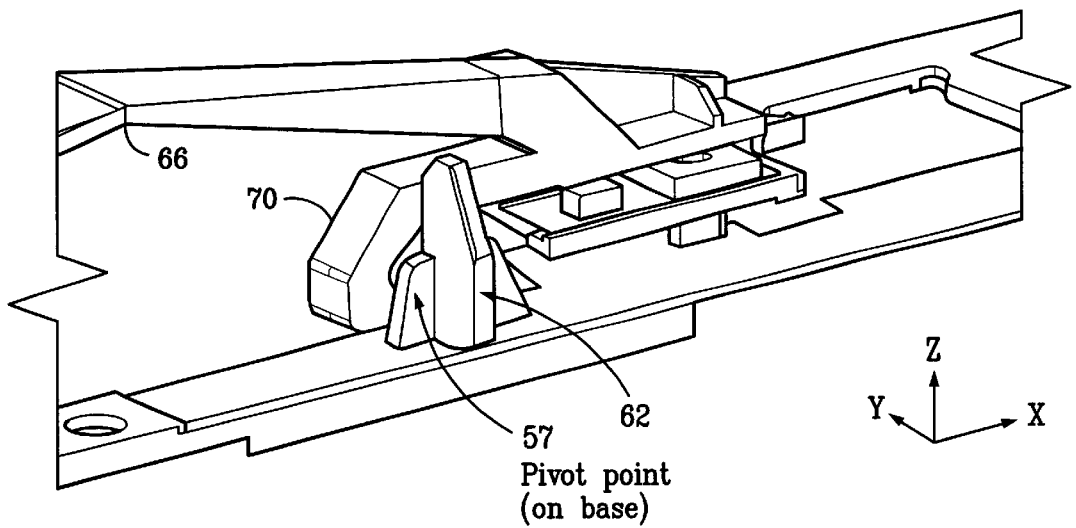
FIG. 8 shows one of the two side constraints.
Figure 9:
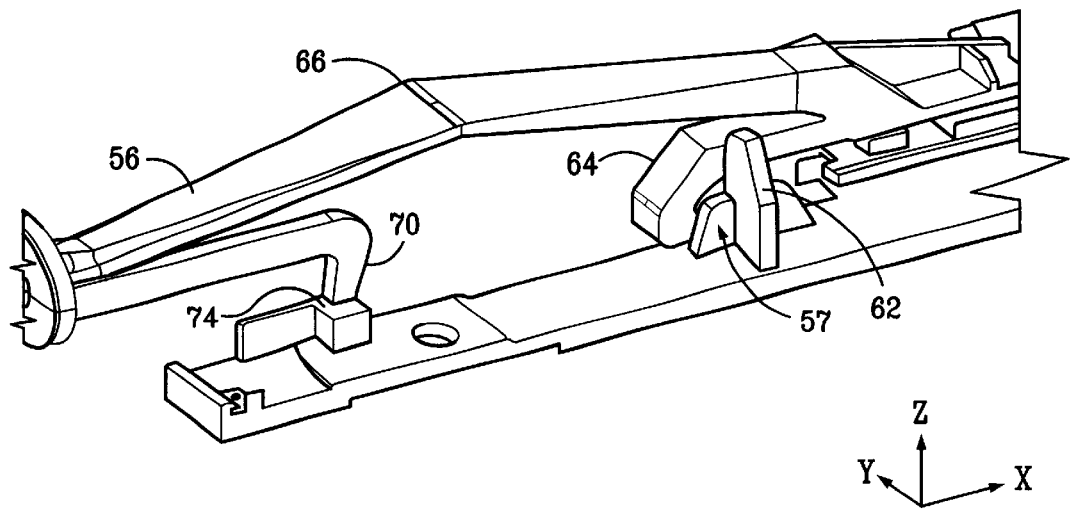
FIG. 9 shows the capture hook and the restraining hook.
Figure 10:
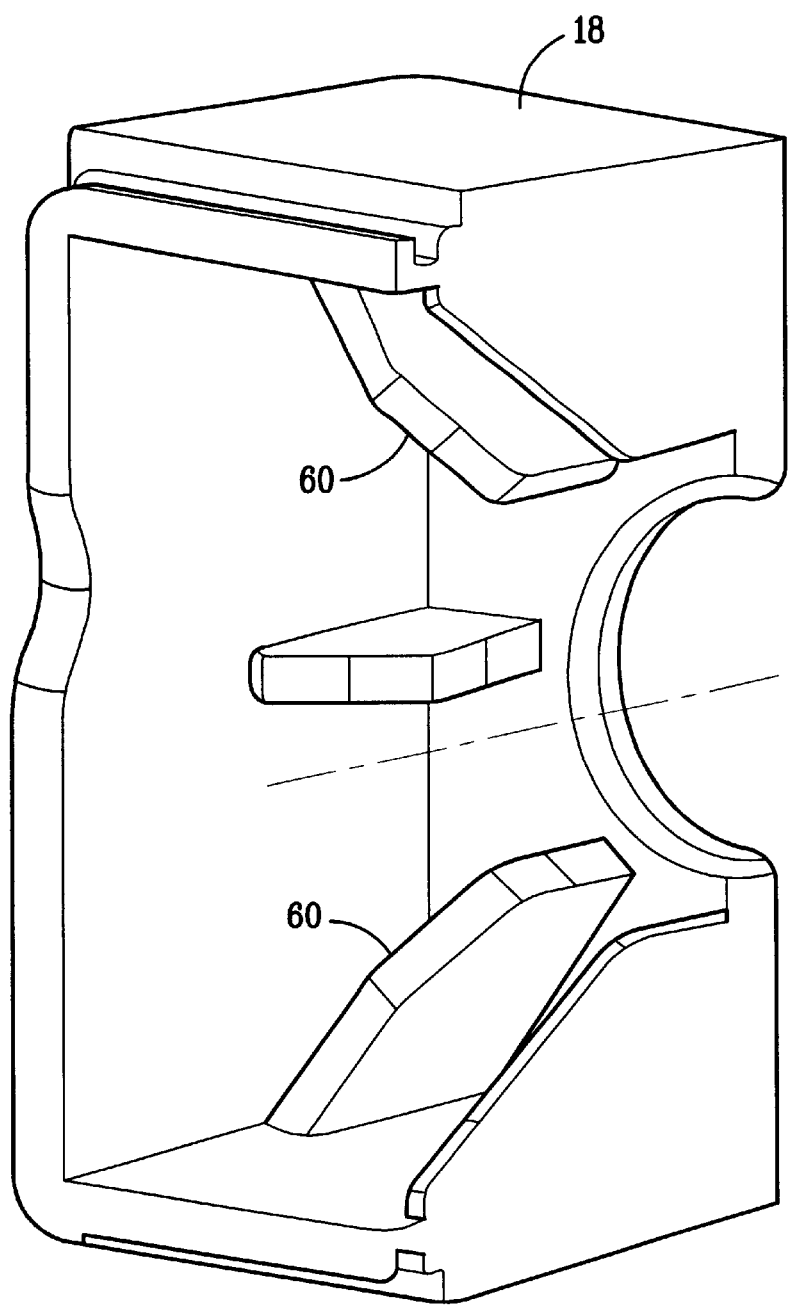
FIG. 10 shows the front bezel and guides in detail.

Guide features 60 (FIGS. 3, 5, 6, and 10) in the front bezel guide 18, the coupling member as the eject button is depressed. A side constraint 62 is best shown in FIGS. 8 and 9. The other side constraint 62 is not shown. A restraining hook 64 restrains motion of the coupling member so that the left-hand portion of the coupling member (as viewed in FIG. 3) cannot translate but only rotates when depressed by the user. Coupling member 56 has a pivot point 57 on the base (FIGS. 4A and 4B). The longitudinal capture hook 70 and the position stop 74 prevent the light pipe from exiting the drive. Coupling member 56 engages switch 54 as the eject button is actuated.

The coupling member 56 has a hinge at 66. The hinge is a thin portion of the plastic which will deflect during actuation of the eject button. The width of the hinge is increased to increase the cross-sectional area enabling sufficient light transfer through this part and increasing the rebounding force after actuation.

The operation of the invention is as follows. The user pushes on the screen portion 58 of the eject button 22 to move the coupling member 56 between the positions shown in FIGS. 4A and 4B. The guide features 60 (FIGS. 5A and 5B) in the front bezel and mating guide features 18 constrain the coupling member 56 so that it cannot rotate but can only translate away from the user. Because the coupling member 56 is captured at the hook 64, the coupling member deflects at the hinge 66 and deflects at and around the hinge 66. The portion of coupling member 56 ahead of the hinge 66 (away from the user) rotates about hook 64. The fore and aft position of the coupling member is constrained by the rotation hook 64 and longitudinal capture hook 70. The contact pad 57 rotates downwardly to contact the switch 54. The spring force of the eject switch 54 and the stored energy of the deflected coupling member at and around the hinge 66 causes the part to return to the initial position as the user force is removed. The capture hook 70 bearing against position stop 74 (FIG. 6) prevents the light pipe from exiting the drive.

While a particular embodiment has been shown and described various modification are possible. All such modifications within the true spirit and scope of the invention are covered by the appended claims.

We claim:

1. A data storage drive for receiving a removable disk cartridge of the type comprising:

an eject member that engages with the disk cartridge and moves from a forward position to a rearward position upon insertion of the disk cartridge into the drive;

an electro-mechanical device that moves said eject member from a rearward position to a forward position for ejecting said cartridge;

a switch for energizing said electro-mechanical device to eject said cartridge when said switch is triggered;

an eject button on said data storage drive; and a coupling member between said eject button and said switch for triggering said switch when said button is actuated, said coupling member being a clear plastic which transmits light to said button to indicate the presence of a cartridge in said drive;

wherein said eject button has an actuation direction, and said switch has a different triggering direction, and wherein said coupling member translates said actuation direction into said triggering direction.

2. The storage drive recited in claim 1 further comprising:

a front bezel for said data storage drive, said eject button being mounted in said front bezel.

3. The storage drive recited in claim 2 further comprising:

guides in said bezel for guiding said coupling member and said eject button as it is actuated.

4. The storage drive recited in claim 1 further comprising:

a capture hook connected to said coupling member, said capture hook engaging a position stop to restrain movement of said coupling member.

5. A data storage drive for receiving a removable disk cartridge of the type comprising:

an eject member that engages with the disk cartridge and moves from a forward position to a rearward position upon insertion of the disk cartridge into the drive;

an electro-mechanical device that moves said eject member from a rearward position to a forward position for ejecting said cartridge;

a switch for energizing said electro-mechanical device to eject said cartridge when said switch is triggered;

an eject button on said data storage drive;

a coupling member between said eject button and said switch for triggering said switch when said button is actuated, said coupling member being a clear plastic which transmits light to said button to indicate the presence of a cartridge, wherein said coupling member has a pivot point, said pivot point constraining said coupling member so that a portion of said coupling member rotates as said button is actuated in the actuating direction.

6. The storage drive recited in claim 5 further comprising:

guides to constrain the motion of said coupling member.

7. The storage drive recited in claim 6 further comprising:

a capture feature allowing said coupling member to be pre-loaded and positioned in the unactuated position.

8. A data storage drive for receiving a removable disk cartridge of the type comprising:

an eject member that engages with the disk cartridge and moves from a forward position to a rearward position upon insertion of the disk cartridge into the drive;

an electro-mechanical device that moves said eject member from a rearward position to a forward position for ejecting said cartridge;

a switch for energizing said electro-mechanical device to eject said cartridge when said switch is triggered;

an eject button on said data storage; and a coupling member between said eject button and said switch for triggering said switch when said button is actuated, said coupling member being a clear plastic which transmits light to said button to indicate the presence of a cartridge in said drive, wherein said coupling member has a localized thin section, said thin section hinging upon actuation of said button so that one portion of said coupling member translates in the actuation direction of said switch.

9. The storage drive recited in claim 8 wherein said coupling member has increased width at said thin section to enable efficient light transfer through said thin section and to increase the rebounding force when said coupling member is deflected.

\* \* \* \* \*